United States Patent
Lai et al.

(10) Patent No.: US 8,693,276 B2
(45) Date of Patent: Apr. 8, 2014

(54) POWER SUPPLY, ASSOCIATED MANAGEMENT UNIT AND METHOD

(75) Inventors: Pengjie Lai, San Jose, CA (US); Jian Jiang, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 165 days.

(21) Appl. No.: 13/339,083

(22) Filed: Dec. 28, 2011

(65) Prior Publication Data
US 2013/0170311 A1 Jul. 4, 2013

(51) Int. Cl.
*G11C 5/14* (2006.01)
(52) U.S. Cl.
USPC ............ 365/226; 365/227; 365/228; 365/229
(58) Field of Classification Search
USPC .................................. 365/226–229
See application file for complete search history.

(56) References Cited

U.S. PATENT DOCUMENTS

| | | | | |
|---|---|---|---|---|
| 5,898,232 A | * | 4/1999 | Reents et al. | ........... 365/226 |
| 8,289,801 B2 | * | 10/2012 | Smith et al. | ........... 365/228 |

OTHER PUBLICATIONS

U.S. Appl. No. 12/956,351, filed Nov. 30, 2010, Disney.
U.S. Appl. No. 13/212,115, filed Aug. 17, 2011, Urienza.

* cited by examiner

*Primary Examiner* — Trong Phan
(74) *Attorney, Agent, or Firm* — Perkins Coie LLP (57) ABSTRACT

The present invention discloses a power supply. The power supply may comprise an input power terminal, a capacitor module, a first converter module and a second converter module. The first converter module may have a first terminal and a second terminal, wherein the first terminal is coupled to the input power terminal and the second terminal is coupled to the capacitor module. The second converter module may comprise an input and an output, wherein the input of the second converter module is coupled to the input power terminal, and the output of the second converter module is configured to supply a load.

20 Claims, 10 Drawing Sheets

POWER SUPPLY, ASSOCIATED MANAGEMENT UNIT AND METHOD

TECHNICAL FIELD

The present invention relates to power supply, and more particularly but not exclusively relates to power supply for solid state drive system.

BACKGROUND

A solid state drive (SSD) is a type of data storage device that uses solid state memory such as flash device to store data with high storage density. A SSD device may comprise a memory unit for storing data, and a management unit for reading data from and writing data to the memory unit. Accordingly, the SSD system requires a power supply for providing multi rails of power supplies to the multiple units.

As a power supply of a SSD system, when the power source at the input power terminal is interrupted or removed, the power supply is required to continue offering power to the SSD device for saving the data. One solution is to directly connect a bunch of storage capacitors at the input for providing energy when the power source is suddenly interrupted. In order to save the data safely, the hold up time should be long enough for saving relative data before the system is entirely off. Usually, a large amount of capacitors are used for storing enough energy, and the capacitors are discharged to a very low voltage for releasing the energy sufficiently. Thus, the capacitors will take up a large area on the circuit board and the cost is increased. Besides, in order to be adapted to the input voltage with a broad range, a buck-boost converter is required for supplying load and the efficiency of the system is low.

Accordingly, an improved power supply is desired to at least overcome part of the above mentioned deficiencies.

SUMMARY

One embodiment of the present invention discloses a power supply comprising an input power terminal, a capacitor module, a first converter module and a second converter module. The first converter module may have a first terminal and a second terminal, wherein the first terminal may be coupled to the input power terminal and the second terminal may be coupled to the capacitor module. The second converter module comprises an input and an output, wherein the input of the second converter module may be coupled to the input power terminal, and the output of the second converter module may be configured to supply a load.

BRIEF DESCRIPTION OF THE DRAWINGS

Non-limiting and non-exhaustive embodiments are described with reference to the following drawings. The drawings are only for illustration purpose. Usually, the drawings only show part of the system or circuit of the embodiments.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

The term of "voltage converter" or "converter" may refer to a device that converts one voltage into another. The term of "predetermined" may refer to the meaning of "fixed", and it may also refer to a predetermined variable value or a controllable variable value.

Figure 1:
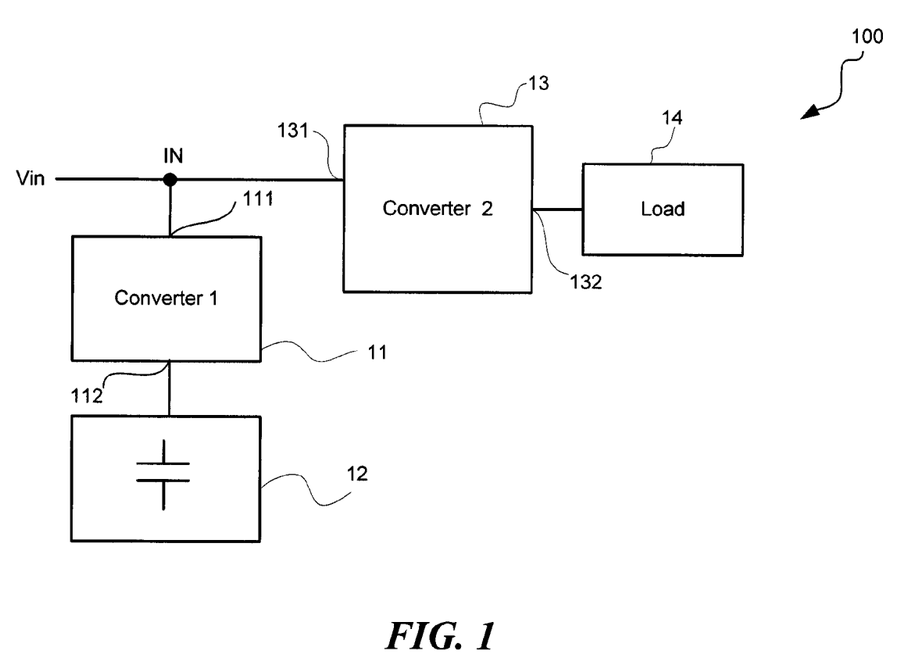
FIG. 1 illustrates a block diagram of a power supply according to an embodiment of the present invention.

FIG. 1 illustrates a power supply 100 according to an embodiment of the present invention. The power supply 100 comprises a first converter module 11, a capacitor module 12 and a converter module 13. The power supply 100 further comprises an input power terminal IN. The first converter module 11 comprises a first terminal 111 and a second terminal 112, wherein the first terminal 111 is coupled to the input power terminal IN and the second terminal 112 is coupled to the capacitor module 12. The second converter module 13 comprises an input 131 and an output 132 wherein the input 131 of the second converter module 13 is coupled to receive the voltage at the input power terminal IN, and wherein the output 132 of the second converter module 13 supplies a load 14.

Figure 2A:
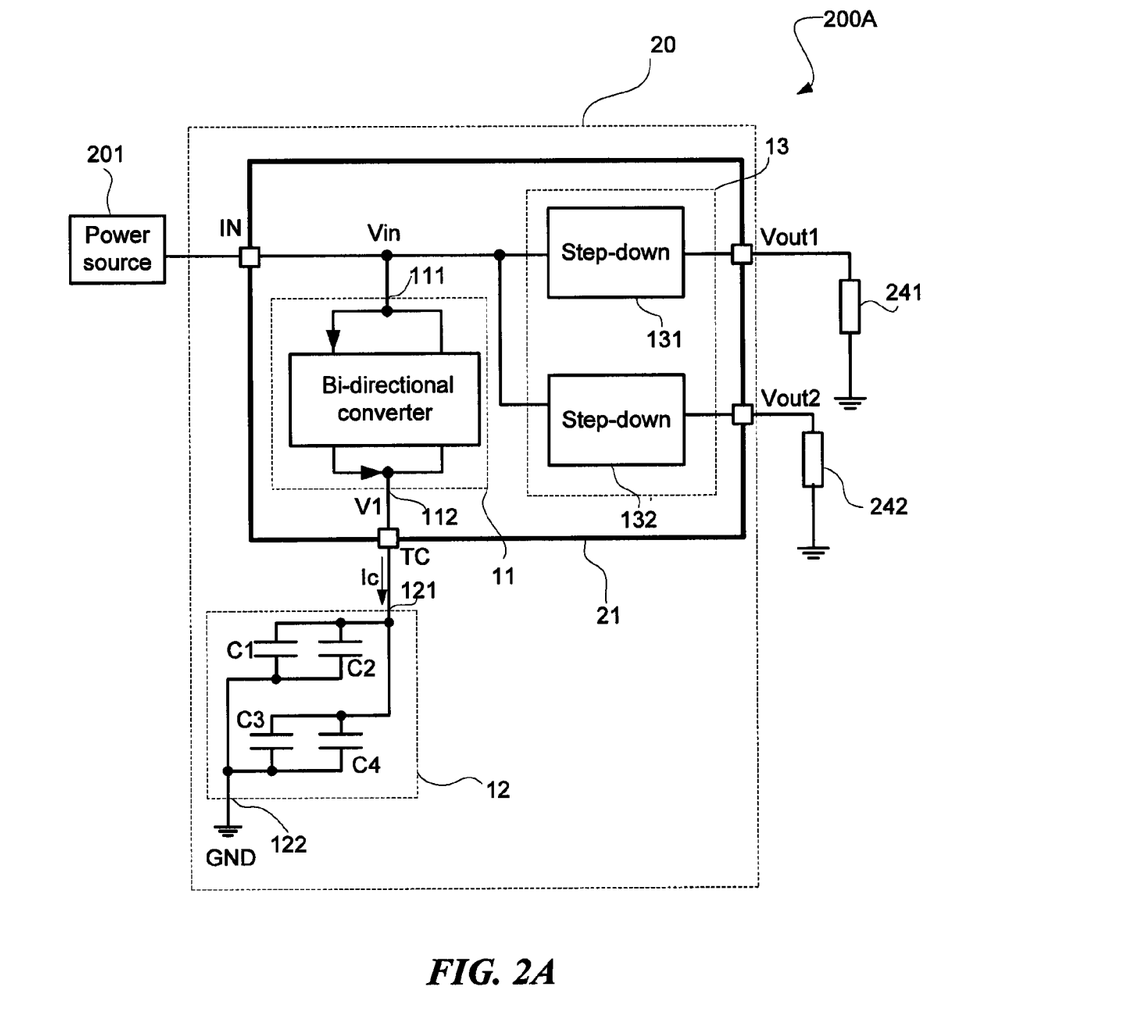
FIG. 2A illustrates a power supply in normal operation according to an embodiment of the present invention.
Figure 2B:
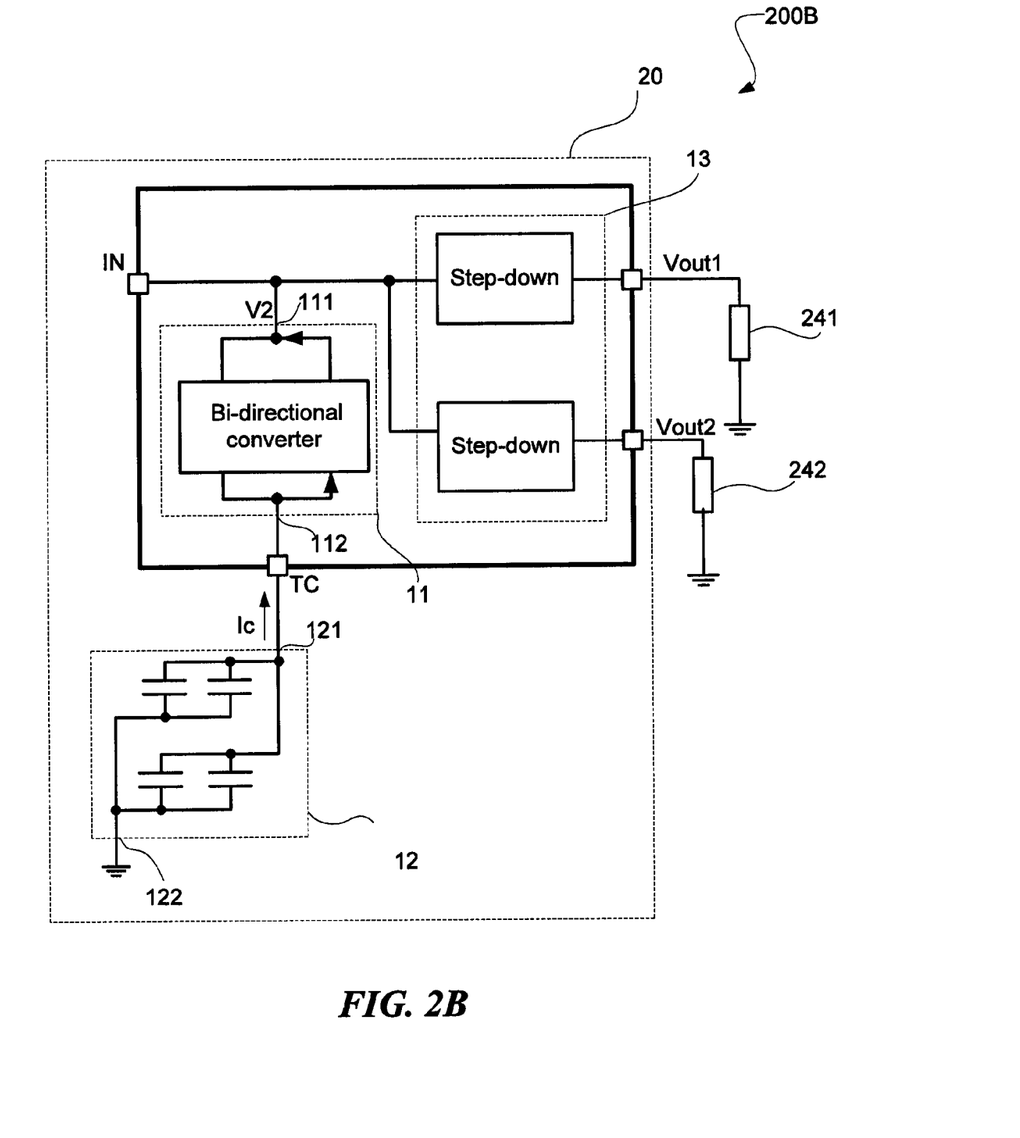
FIG. 2B illustrates a power supply when the power source is removed according to an embodiment of the present invention.

Continuing with FIG. 1, in one embodiment, the first converter module 11 comprises a bi-directional converter which converts the voltage in two directions based on certain conditions which may refer to FIGS. 2A and 2B. In another embodiment, the first converter module 11 comprises a step-up converter and a step-down converter coupled in parallel referring to FIG. 3. In one embodiment, the capacitor module 12 comprises one capacitor. And in another embodiment, the capacitor module 12 comprises a plurality of capacitors coupled in parallel. In one embodiment, the second converter module 13 comprises a step-down converter or a buck converter. And in another embodiment, the second converter module 13 comprises a plurality of step-down converters. In one embodiment, the load 14 is a SSD device.

Continuing with FIG. 1, in one embodiment, the first converter module 11 comprises a bi-directional converter and the bi-directional converter converts the voltage Vin into a higher voltage at the second terminal 112 during normal operation when a power source is connected to the input power terminal IN. The converted voltage at the second terminal 112 is held by the capacitor module 12 and accordingly during normal operation, the capacitor module 12 is charged and energy is stored in the capacitor module 12. During normal operation, the second converter module 13 is supplied by the external power source. When the power source is removed, a delayed shutting down action is required which permits that the output voltage of the second converter module 13 is held on for a time period, for example for saving the data of a memory device.

FIG. 2A illustrates a power supply system 200A during a normal operation status where an input power terminal IN is coupled to a power source 201 according to an embodiment of the present invention. FIG. 2B illustrates a power supply system 200B when a power source is removed and a capacitor module 12 continues to offer energy for holding on the output voltages Vout1 and Vout2 for a time period according to an embodiment of the present invention. Both power supply systems 200A and 200B comprise a power supply 20 for supplying a plurality of loads 241 and 242. In one embodiment, the power source 201 is a battery or a battery pack.

Figure 6:
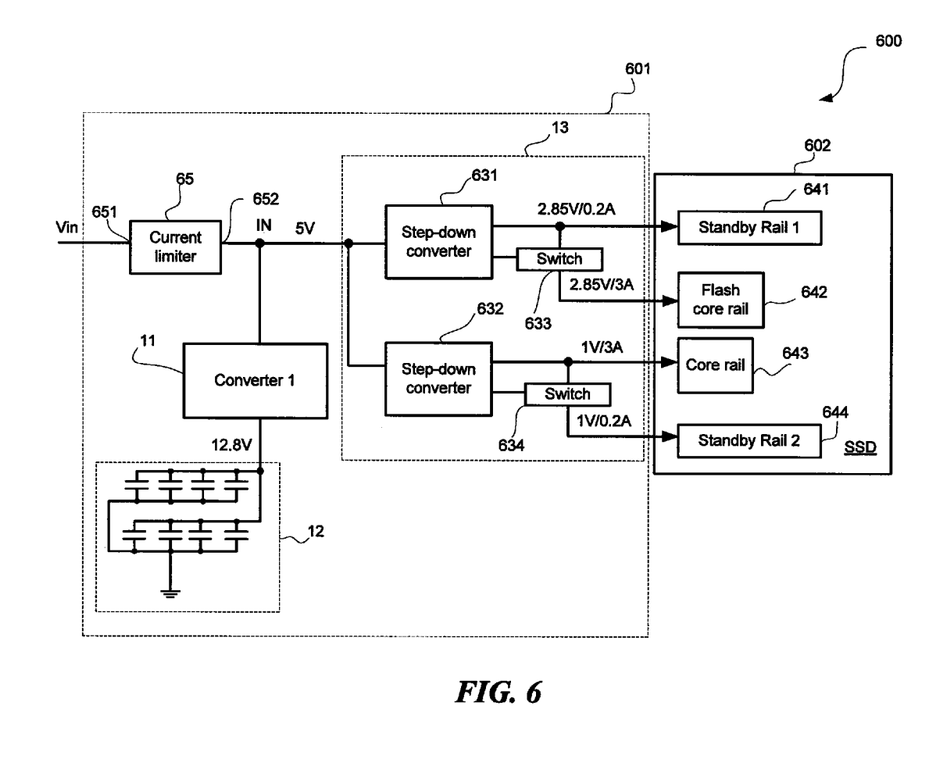
FIG. 6 illustrates a SSD system comprising a power supply and a SSD device, according to an embodiment of the present invention.

Referring to FIG. 2A, the power supply 20 comprises a first converter module 11, a capacitor module 12 and a second converter module 13. The first converter module 11 and the second converter module 13 together comprise a power management unit 21. In one embodiment, power management unit 21 comprises an integrated chip manufactured in a semiconductor substrate. In another embodiment, the control units and power switches of power management unit 21 comprises an integrated chip while the other components of power management unit 21 such as the capacitors and inductors are external from the integrated chip. The first converter module 11 comprises a bi-directional converter 11. In the shown embodiment, power management unit 21 comprises an input power terminal IN coupled to power source 201, a capacitor terminal TC coupled to capacitor module 12, the bi-directional converter 11 coupled between terminal IN and terminal TC, and the second voltage converter module 13. In one embodiment, the input power terminal IN and the capacitor terminal TC comprise leads of a chip. The input power terminal IN is coupled to the first terminal 111 of the bi-directional converter 11, and the capacitor terminal TC is coupled to the second terminal 112 of the bi-directional converter 11. The bi-directional converter 11 is coupled to the capacitor module 12 at capacitor terminal TC. The second converter module 13 comprises an input coupled to input power terminal IN and a plurality of outputs Vout1 and Vout2 configured to supply a plurality of loads 241 and 242. The second converter module 13 comprises internally a first step-down converter 131 and a second step-down converter 132. A step-down converter 131 or 132 can be any conventional step-down converter such as a buck converter 600 as shown in FIG. 6. The first step-down converter 131 converts the voltage at the input power terminal IN into a lower voltage Vout1 and supplies the first load 241 and the second step-down converter 132 converts the voltage at the input power terminal IN into a lower voltage Vout2 and supplies the second load 242. In one embodiment, Vout1 is higher than Vout2. And the different voltage levels of Vout1 and Vout2 are required by different loads. The number of the step-down voltage converters is not limited to 2, and any positive integer of quantity may be used without departing from the spirit of the present invention.

Continuing with FIG. 2A, the capacitor module 12 comprises a plurality of capacitors C1-C4 coupled in parallel. Wherein a first ends of capacitors C1-C4 are coupled together at a third terminal 121, and a second ends of capacitors C1-C4 are coupled together at a fourth terminal 122. The third terminal 121 is coupled to the second terminal 112 of the bi-directional converter 11. And the fourth terminal 122 is coupled to a reference ground GND. In another embodiment, the capacitor module 12 may comprise one capacitor. And any number in positive integer of the capacitors is appropriate.

Continuing with FIG. 2A, power supply 20 operates in normal operation status when input power terminal IN is coupled to an external power source 201. In this mode, the power source 201 offers energy to loads 241 and 242 via the second converter module 13. Besides, the power source 201 further stores energy in capacitor module 12. The power source 201 has an input voltage Vin at the input power terminal IN. The first step-down converter 131 converts voltage Vin into a lower voltage Vout1 and supplies load 241. The second step-down converter 132 steps down voltage Vin into Vout2 and supplies load 242. During the normal operation when the input power terminal IN is coupled to the power source 201, the bi-directional converter 11 converts the input voltage Vin into a voltage V1. A current Ic flows from the bi-directional converter 11 into capacitor module 12 and stores energy in the capacitor module 12. Once the voltage V1 reaches a first predetermined voltage V10 which is higher than Vin, bi-directional converter 11 stops to charge capacitor module 12 and Ic=0. And when V1 drops below V10, bi-directional converter 11 continues to charge capacitor module 12 until V1 reaches V10 again. In other words, during normal operation, the bi-directional converter 11 converts the voltage at input power terminal IN into the first predetermined voltage V10 to charge the capacitor module. In one embodiment, Vin is in the range of 4.5 Volts to 5.5 Volts and V10 is in the range of 12 Volts to 13 Volts.

Now referring to FIG. 2B, power supply 20 operates in shutting down status when the input power terminal IN is disconnected from a power source and voltage at the input power terminal IN is held on for a time period by capacitor module 12. Once the power source 201 is removed, bi-directional converter 11 converts the voltage at capacitor terminal TC into a second predetermined voltage V2 at the input power terminal IN. Current Ic flows from capacitor module 12 to the bi-directional converter 11 and the capacitor module 12 is discharged. In a preferred embodiment, the first predetermined voltage V10 is higher than the second predetermined voltage V2. In one embodiment, V10 is higher than 2*V2. For example, V10 is in the range of 12 Volts to 13 Volts while V2 is in the range of 3 Volts to 6 Volts. The second converter module 13 converts the voltage V2 into a plurality of lower outputs Vout1 and Vout2 and continues to supply loads 241 and 242. In this way, energy flows from capacitor module 12 to the loads via the bi-directional converter 11 and the second converter module 13. In one embodiment, the loads 241 and 242 are memory devices and during this shutting down status, the data of the memory devices are saved. Since the capacitor module 12 is discharged, the voltage at the capacitor terminal TC decreases and when it decreases below a second predetermined voltage, the bi-directional converter and the second converter module 13 stops working and the power supply is entirely off.

As one of the benefits of the present invention, the bi-directional converter 11 charges capacitor module 12 to a high first predetermined voltage and thus the energy stored in capacitor module 12 can be high even with a capacitor module 12 having small capacitance. During the shutting down status, the bi-directional converter converts the voltage at the capacitor module 12 into a second predetermined voltage at the input power terminal and may decrease the voltage at the capacitor module 12 into a very low voltage which can substantially release the energy stored in the capacitor module 12. For example, supposing that the capacitance of the capacitor module 12 is C, the first predetermined voltage is V10 and the second predetermined voltage is V2, the released energy during shutting down status is $\frac{1}{2}C(V10^2 - V2^2)$. When V10 is set to be high and V2 is set to be low, the energy released by a small capacitance during shutting down status may be high enough for turning off the system safely. Accordingly, the volume of the capacitor module may be reduced, which may reduce the area the capacitor module 12 takes and as well as reduce the cost.

Figure 3:
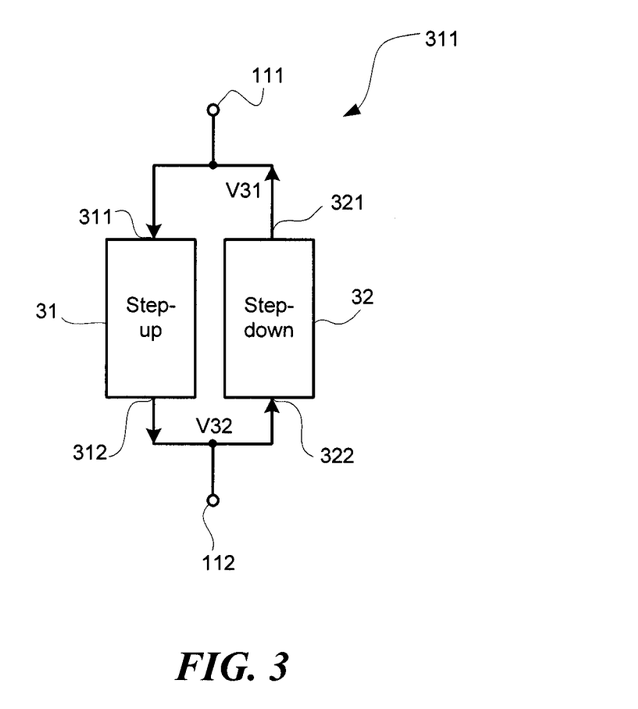
FIG. 3 illustrates a first converter module according to an embodiment of the present invention.
Figure 8:
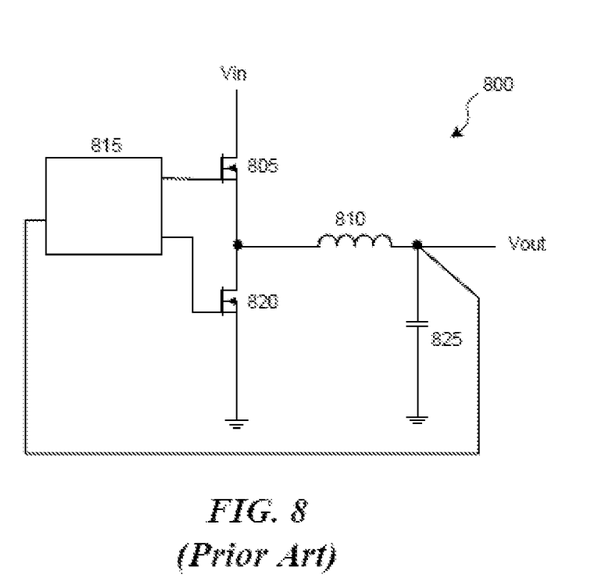
FIG. 8 illustrates a topology of a prior art buck converter.
Figure 9:
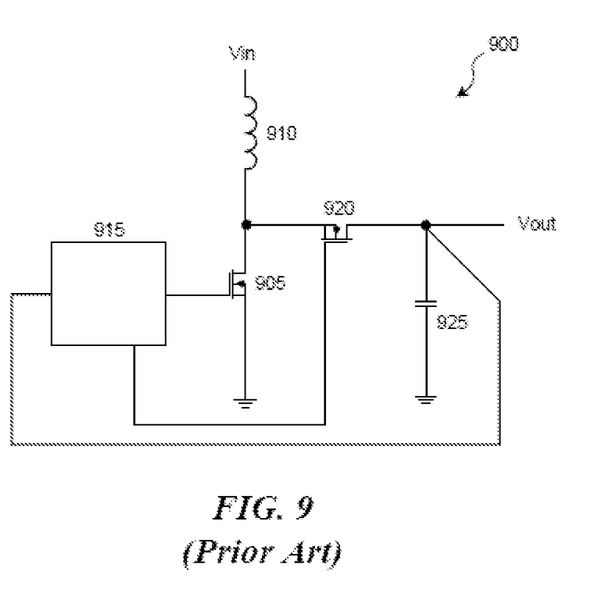
FIG. 9 illustrates a topology of a prior art boost converter.

FIG. 3 illustrates a first converter module 311 which comprises a step-up voltage converter 31 and a step-down voltage converter 32 coupled in parallel. Now the first converter module 311 will be described in combination with FIG. 1. Step-up converter 31 has an input 311 and an output 312. Step-down converter 32 has an input 321 and an output 322. The input 311 of step-up converter 31 and the output 321 of the step-down converter 32 are coupled together at the first terminal 111 and are coupled to the input power terminal IN. The output 312 of the step-up converter 31 and the input 322 of the step-down converter 322 are coupled together at the second terminal 112 and are coupled to the capacitor module 12. When the input power terminal IN is connected to a power source, the step-up converter converts the input voltage of the power source into a voltage V32 and charges the capacitor module. It is noted that in one embodiment, the shown voltage V32 is a variable parameter. The step-up converter 31 stops to charge the capacitor module 12 until V32 reaches a first predetermined value. When the input power terminal is disconnected from a power source and once the power source is removed, the step-down converter 32 starts to discharge the capacitor module 12 and converts the voltage V32 into a voltage V31. In one embodiment, V31 is a second predetermined voltage and the first predetermined voltage is higher than the second predetermined voltage. The step-up converter 31 and step-down converter 32 can adopt any suitable converter. For example, FIG. 8 illustrates a conventional step-down voltage converter 800 (or buck converter) and FIG. 9 illustrates a conventional step-up voltage converter 900 (or a boost converter). The step-down voltage converter 800 includes a first transistor 805, which is coupled to $V_{in}$, an inductor 810, a second transistor 820, and a controller 815. The inductor 810 is further coupled to $V_{out}$, a capacitor 825, and the controller 815. The second transistor 820 is further coupled to the controller 815 and ground. The step-up voltage converter 900 includes an inductor 910 coupled to $V_{in}$, a first transistor 805, and a second transistor 920. The first transistor 905 is further coupled to the second transistor 920, a controller 915, and ground. The second transistor 905 is further coupled to the controller 915, a capacitor 925, and $V_{out}$.

Figure 4A:
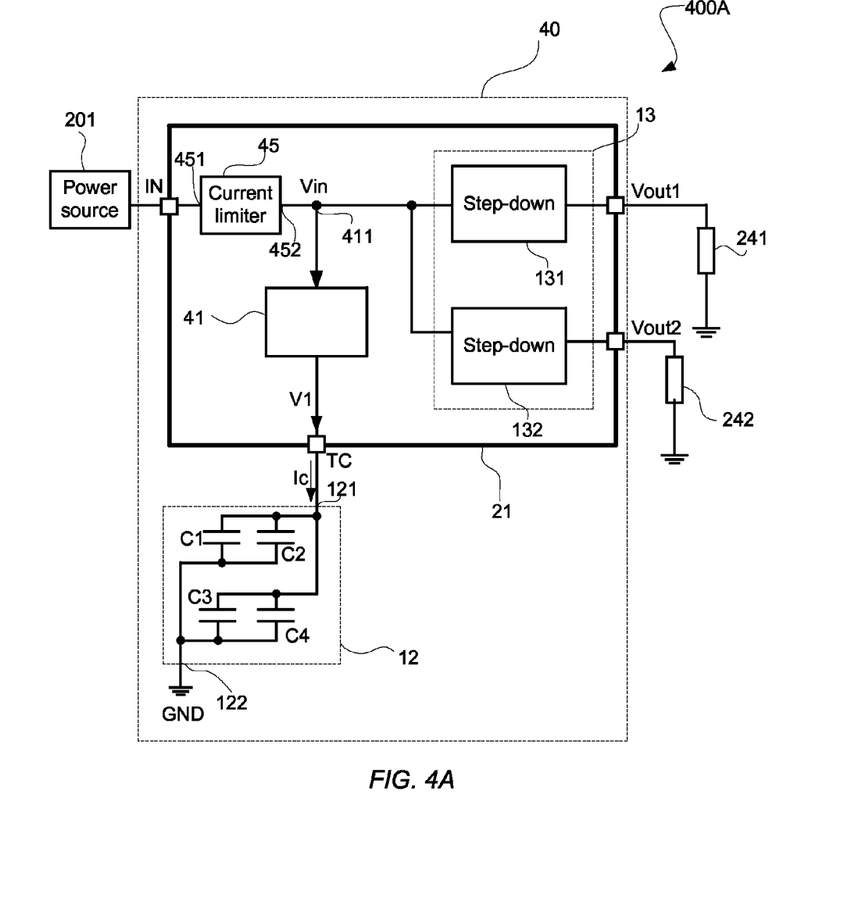
FIG. 4A illustrates a power supply comprising a current limiting circuit during normal operation, according to an embodiment of the present invention.
Figure 4B:
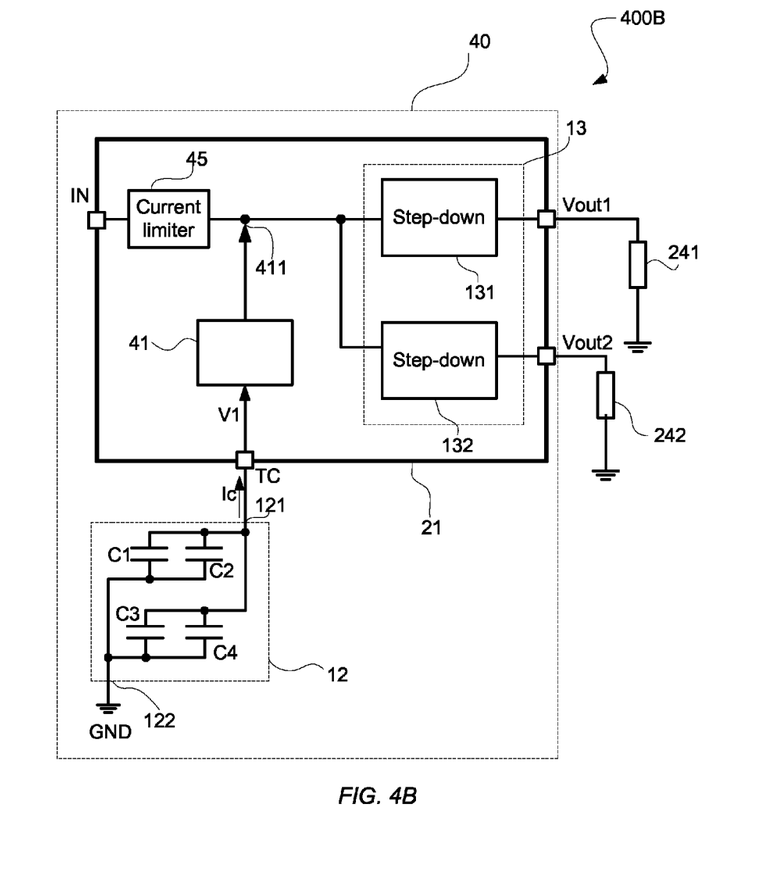
FIG. 4B illustrates the power supply of FIG. 4A during shutting down status, according to an embodiment of the present invention.

FIGS. 4A and 4B illustrate a power supply 40 comprising a current limiting circuit 45, according to an embodiment of the present invention. Wherein FIG. 4A refers to a power supply system 400A comprising the power supply 40 during normal operation status according to an embodiment of the present invention and FIG. 4B refers to a power supply system 400B comprising the power supply 40 during shutting down status according to an embodiment of the present invention. The power supply 40 comprises a power management unit 21 and a capacitor module 12. The power management unit 21 comprises externally an input power terminal IN, a capacitor terminal TC and a plurality of output terminals Vout1 and Vout2. The power management unit 21 comprises internally a current limiting circuit 45, a bi-directional converter 41 and a second converter module 13. Wherein the current limiting circuit 45 comprises an input 451 coupled to the input power terminal IN and an output 452 coupled to the bi-directional converter 41 and the second converter module 13. In another embodiment, the current limiting circuit is coupled external to the power management unit 21 and the current limiting circuit comprises an input selectively coupled to a power source 201 and comprises an output coupled to the input power terminal IN.

Referring to FIG. 4A, during normal operation, the power source 201 is coupled to the current limiting circuit 45 and the current limiting circuit 45 is turned on. In one embodiment, the current limiting circuit 45 comprises two back to back metal oxide semiconductor field effect transistors (MOSFETs) 51 and 52 referring to FIG. 5. During normal operation, when an input current flowing through current limiting circuit 45 is larger than a threshold value, the resistance of current limiting circuit 45 is increased by a control signal to limit the input current. And when the input current is lower than the threshold value, the current limiting circuit 45 is entirely turned on and has a low resistance for high efficiency. During the normal operation, bi-directional converter 41 works under boost mode and boosts the voltage Vin at node 411 into V1 and charges the capacitor module 12.

Now referring to FIG. 4B, the power supply system 400B is during shutting down status when a power source is removed. In one embodiment, this status is detected when the voltage at input power terminal IN is lower than a threshold. Once the shutting down status is detected, bi-directional converter 41 works under the buck mode. Bi-directional converter 41 converts voltage V1 into a lower voltage at node 411 and supplies the second converter module 13. At the meantime, current limiting circuit 45 is turned off and blocks reverse current flowing from node 411 to input power terminal IN.

Figure 5:
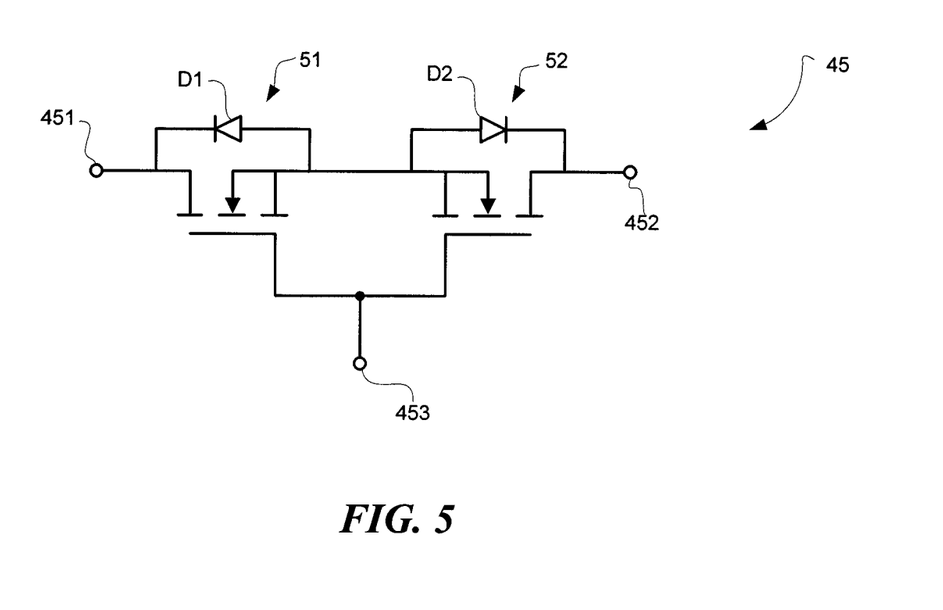
FIG. 5 illustrates a current limiting circuit according to an embodiment of the present invention.

FIG. 5 illustrate a current limiting circuit 45 according to an embodiment of the present invention. Current limiting circuit 45 comprises externally an input 451, an output 452 and a control terminal 453. The current limiting circuit 45 further comprises internally a first N-type MOSFET 51 and a second N-type MOSFET 52 coupled back to back in series. The first MOSFET 51 has a drain coupled to input 451, a source coupled to a source of the second MOSFET 52, and a gate coupled to the control terminal 453. The second MOSFET 52 further has a drain coupled to the output 452 of current limiting circuit the load. In one embodiment, the second voltage V2 is variable. In another embodiment, the second voltage V2 is a predetermined voltage. In one embodiment, V2 is lower than the first voltage when the capacitor module is saturated while the first voltage is higher than the input voltage of the power source.

FIG. 6 illustrates a SSD system 600 according to an embodiment of the present invention. The SSD system 600 comprises a power supply 601 and a SSD device 602. SSD device 602 is a memory device which comprises a storage unit for storing data and a management unit for reading data from and writing data to the storage unit. The storage unit and the management unit require different power supply voltages. SSD device 601 comprises four power supply rails, including a first standby rail 641, a flash core rail 642, a core rail 643 and a second standby rail 444. For example, the first standby rail requires a first input voltage of about 2.85 Volts and a first current of about 0.2 Ampere. The flash core rail requires the first input voltage of about 2.85 Volts and a second current of about 3 Amperes. The core rail requires a second voltage of about 1 Volt and a current of about 3 Ampere. And the second standby rail requires the second voltage of 1 Volt and a current of 0.2 Ampere. In some embodiments, SSD device 601 may be deemed as one load as a whole, and in some other embodiments, the multiple rails of SSD device may be deemed as a plurality of loads.

Continuing with FIG. 6, power supply 601 offers power supply for SSD device 602, including offering a first power supply of about 2.85 Volts and 0.2 Ampere, a second power supply of about 2.85 Volts and 3 Amperes, a third power supply of about 1 Volt and 3 Amperes and a fourth power supply of about 1 Volt and 0.2 Ampere. Power supply 601 comprise a current limiting circuit 65, an input power terminal IN, a first converter module 11, a capacitor module 12 and a second converter module 13. Current limiting circuit 65 comprises an input 651 and an output 652. Input 651 is coupled to a power source during normal operation, and may be floated when the power source is removed. Output 652 is coupled to the input power terminal. The first converter module 11 is coupled between the input power terminal IN and the capacitor module 12, configured to store energy in capacitor module 12 during normal operation and to discharge capacitor module 12 for supplying the second converter module 13 during shutting down status. In the shown embodiment, the input voltage of the power source during normal operation and the converted voltage by the first converter module 11 at terminal IN are desired to be about 5 Volts. And the capacitor module 12 is desired to be charged to about 12.8 Volts. With the first converter module 11, the high voltage of 12.8 Volts can be used for the second converter module 13 during shutting down status. Thus high energy can be stored in the capacitor module 12. And the capacitance of capacitor module 12 can be lowered down for a predetermined energy level. The second converter module 13 comprises a first step-down converter 631 and a second step-down converter 632. The second converter module 13 further comprises a first switch 633 coupled between the first step-down converter 631 and the flash core rail 642, and a second switch 634 coupled between the second step-down converter 632 and the core rail 644. The first switch 633 and the second switch 634 are used to selectively supply flash core rail 642 and core rail 643 respectively. The first step-down converter 631 converts the voltage at terminal IN into a predetermined voltage of 2.85 Volts and offers a first power supply of 2.85 Volts to the first standby rail 641 and flash core rail 642. The second step-down converter 632 converts the voltage at terminal IN into a predetermined voltage of 1 Volt and offers a second power supply to core rail 643 and the second standby rail 444.

Though FIG. 6 shows a SSD system as an example, the power supply in embodiments referring to FIGS. 1-4 may be used for other type of load, for example, for other type of memory device and any other devices/circuits whose power needs to be held on for a time period when the external power source is interrupted.

Figure 7:
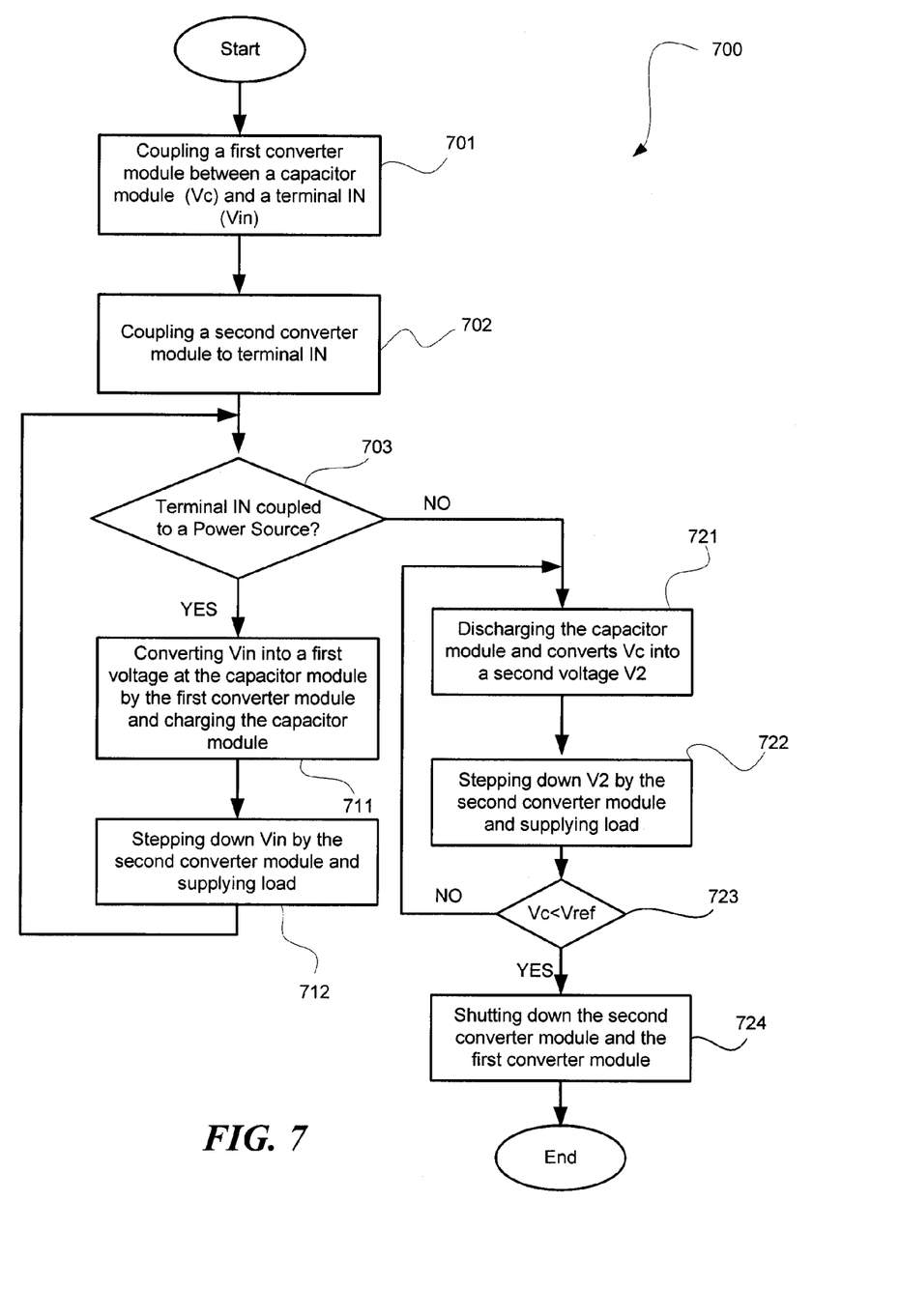
FIG. 7 illustrates a method of supplying a load according to an embodiment of the present invention.

FIG. 7 illustrates a method of supplying a load according to an embodiment of the present invention. The method comprising supplying the load by a power source during normal operation, and supplying the load through discharging a capacitor module during shutting down status. While during normal operation, the power source stores energy in the capacitor module with a higher voltage than the input voltage of the power source.

Referring to FIG. 7, the method 700 comprises a first step 701 of coupling a first converter module between a capacitor module and an input power terminal IN and a second step 702 of coupling a second converter module to terminal IN. Method 700 further comprises steps 711 and 712 when terminal IN is coupled to a power source as judged in step 703. And method 700 further comprises steps 721-724 when the power source is removed or terminal IN is disconnected from a power source as judged in step 703.

In step 711, once the input power terminal IN is coupled to a power source, the load is supplied by the power source via the second converter module. At the meantime, an input voltage of the power source is converted into a first voltage by the first converter module and charges the capacitor module. In one embodiment, the first voltage is higher the input voltage Vin.

At the meantime, in step 712, the second converter module converts and steps down input voltage Vin of the power source into a lower voltage and the lower voltage supplies the load. In one embodiment, the second converter module comprises a plurality of step-down converters and converts input voltage Vin into a plurality of output voltages which supply a plurality of parts of the load.

When the power source is removed or is interrupted, the input power terminal IN is disconnected from the power source. And some information needs to be stored before the system is entirely off. Accordingly, the stored capacitor module releases the energy and supplies the load via the first converter module and the second converter module. In step 721, the first converter module converts the capacitor voltage Vc into a second voltage V2 and discharges the capacitor module. The energy stored in the capacitor module supplies the load. In one embodiment, the second voltage V2 is variable. In another embodiment, the second voltage V2 is a predetermined voltage. In one embodiment, V2 is lower than the first voltage when the capacitor module is saturated while the first voltage is higher than the input voltage of the power source.

At the meantime, in step 722, voltage V2 is converted into a lower voltage Vout by the second converter module and Vout supplies the load. In one embodiment, voltage V2 is converted by a plurality of step-down converters of the second converter module and provides a plurality of output voltages which supply a plurality of parts of the load.

In one embodiment, when terminal IN is disconnected from the power source, capacitor voltage Vc is compared to a reference voltage Vref. Vc decreases and when Vc is lower than Vref in step 723, the first converter module and the second converter module are shut down and the load system is totally power off. If Vc is higher than Vref, steps 721 and 722 continue to be performed.

However, in another embodiment, the first converter module and the second converter module are shut down when the second voltage V2 is lower than a reference voltage.

The method may further comprise coupling a current limiting circuit before the input power terminal as described with reference to FIGS. 4A and 4B, wherein when the current limiting circuit is coupled to the power source, the current limiting circuit is turned on, and the first converter module boosts the voltage at the input power terminal into the first voltage to charge the capacitor module. And when the power source is removed, the current limiting circuit is turned off and blocks reverse current; at the meantime, the first converter module steps down the voltage at the capacitor module into the second voltage to supply the second converter module.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A power supply, comprising:
   an input power terminal;
   a capacitor module;
   a first converter module having a first terminal and a second terminal, wherein the first terminal is coupled to the input power terminal and wherein the second terminal is coupled to the capacitor module; and
   a second converter module comprising an input and an output, wherein the input of the second converter module is coupled to the input power terminal, and wherein the output of the second converter module is configured to supply a load.

2. The power supply of claim 1, wherein the first converter module comprises a bi-directional converter, and wherein:
   when the input power terminal is coupled to a power source, the bi-directional converter is configured to convert the voltage at the input power terminal into a first predetermined voltage at the second terminal, wherein the bi-directional converter is configured to charge the capacitor module; and
   when the power source is removed, the bi-directional converter is configured to convert the voltage at the second terminal into a second predetermined voltage at the first terminal; and
   wherein the first predetermined voltage is higher than the second predetermined voltage.

3. The power supply of claim 1, wherein the first converter module comprises:
   a step-up converter having an input and an output; and
   a step-down converter having an input and an output;
   wherein the input of the step-up converter and the output of the step-down converter are coupled to the first terminal, and wherein the output of the step-up converter and the input of the step-down converter are coupled to the second terminal.

4. The power supply of claim 1, wherein the load comprises a solid state drive device.

5. The power supply of claim 1, wherein the capacitor module comprises a plurality of capacitors coupled in parallel.

6. The power supply of claim 5, wherein the capacitor module comprises a third terminal coupled to a first ends of the plurality of capacitors and comprises a fourth terminal coupled to a second ends of the plurality of capacitors, wherein the third terminal is coupled to the second terminal of the first converter module, and wherein the fourth terminal is coupled to a reference ground.

7. The power supply of claim 1, further comprising a current limiting circuit comprising an input and an output, wherein the input of the current limiting circuit is selectively coupled to a power source and the output of the current limiting circuit is coupled to the input power terminal, wherein when the power source is coupled to the current limiting circuit, the current limiting circuit is turned on, and wherein when the power source is removed, the current limiting circuit is turned off and blocks reverse current.

8. The power supply of claim 7, wherein the current limiting circuit comprising two back to back metal oxide semiconductor field effect transistors (MOSFETs).

9. The power supply of claim 1, wherein the second converter module comprises a plurality of step-down converters, and wherein the plurality of step-down converters are configured to supply a plurality of loads.

10. The power supply of claim 1, wherein:
    the second converter module comprises a first step-down converter and a second step-down converter;
    the load comprises a solid state drive device comprising a flash core rail, a first standby power rail, a core rail and a second standby power rail;
    wherein the first step-down converter is configured to supply the flash core rail and the first standby power rail; and
    the second step-down converter is configured to supply the core rail and the second standby power rail.

11. The power supply of claim 10, wherein the second converter module further comprises:
    a first switch coupled between the first step-down converter and the flash core rail; and
    a second switch coupled between the second step-down converter and the core rail.

12. A power management unit, comprising:
    an input power terminal selectively coupled to a power source;
    a capacitor terminal coupled to a capacitor module;
    a bi-directional converter coupled between the input power terminal and the capacitor terminal; and
    a second converter module coupled to the input power terminal, the second converter module having a plurality of outputs, wherein the plurality of outputs are configured to supply a plurality of loads.

13. The power management unit of claim 12, wherein:
    when the input power terminal is coupled to a power source, the bi-directional converter is configured to convert the voltage at the input power terminal into a first predetermined voltage at the capacitor terminal, wherein the first predetermined voltage is configured to charge the capacitor; and
    when the input power terminal is not coupled to a power source, the bi-directional converter is configured to convert the voltage at the capacitor terminal into a second predetermined voltage, wherein the second predetermined voltage is configured to supply the second converter module, and wherein the first predetermined voltage is higher than the second predetermined voltage.

14. The power management unit of claim 13, wherein the first predetermined voltage is twice higher than the second predetermined voltage.

15. The power management unit of claim 12, wherein the second voltage converter module comprises a first buck converter and a second buck converter, and wherein the output of the first buck converter is higher than the second buck converter.

16. The power management unit of claim 12 further comprising a current limiting circuit, wherein the current limiting circuit comprises:
    an input coupled to the input power terminal; and
    an output coupled to the bi-directional converter and the second converter module.

17. The power management unit of claim 16, wherein the current limiting circuit comprising two back to back MOSFETs.

18. A method of supplying a load, comprising:
    coupling a first converter module between an input power terminal and a capacitor module; and
    coupling a second converter module to the input power terminal, and the second converter module supplying a load; wherein
    when the input power terminal is coupled to a power source, supplying the load by the power source via the second converter module, and converting an input voltage of the power source into a first voltage by the first converter module for charging the capacitor module; and when the power source is removed, discharging the capacitor module and converting a capacitor voltage into a second voltage by the first converter module, and supplying the load by the second voltage via the second converter module.

19. The method of claim 18, wherein when the power source is removed, the method further comprising comparing the capacitor voltage to a reference voltage, and wherein when the capacitor voltage is lower than the reference voltage, shutting down the first converter module and the second converter module.

20. The method of claim 18, further comprising coupling a current limiting circuit between the power source and the input power terminal, wherein:

when the current limiting circuit is coupled to the power source, the current limiting circuit is turned on, and the first converter module boosts the voltage at the input power terminal into the first voltage to charge the capacitor module; and when the power source is removed, the current limiting circuit is turned off and blocks reverse current, and the first converter module steps down the voltage at the capacitor module into the second voltage to supply the second converter module.

* * * * *